Nov. 1, 1966  R. I. NORMAN, JR  3,283,324
MEANS FOR CHANGING THE RADAR SIGNATURE OF AERIAL VEHICLES
Filed June 29, 1964  3 Sheets-Sheet 1
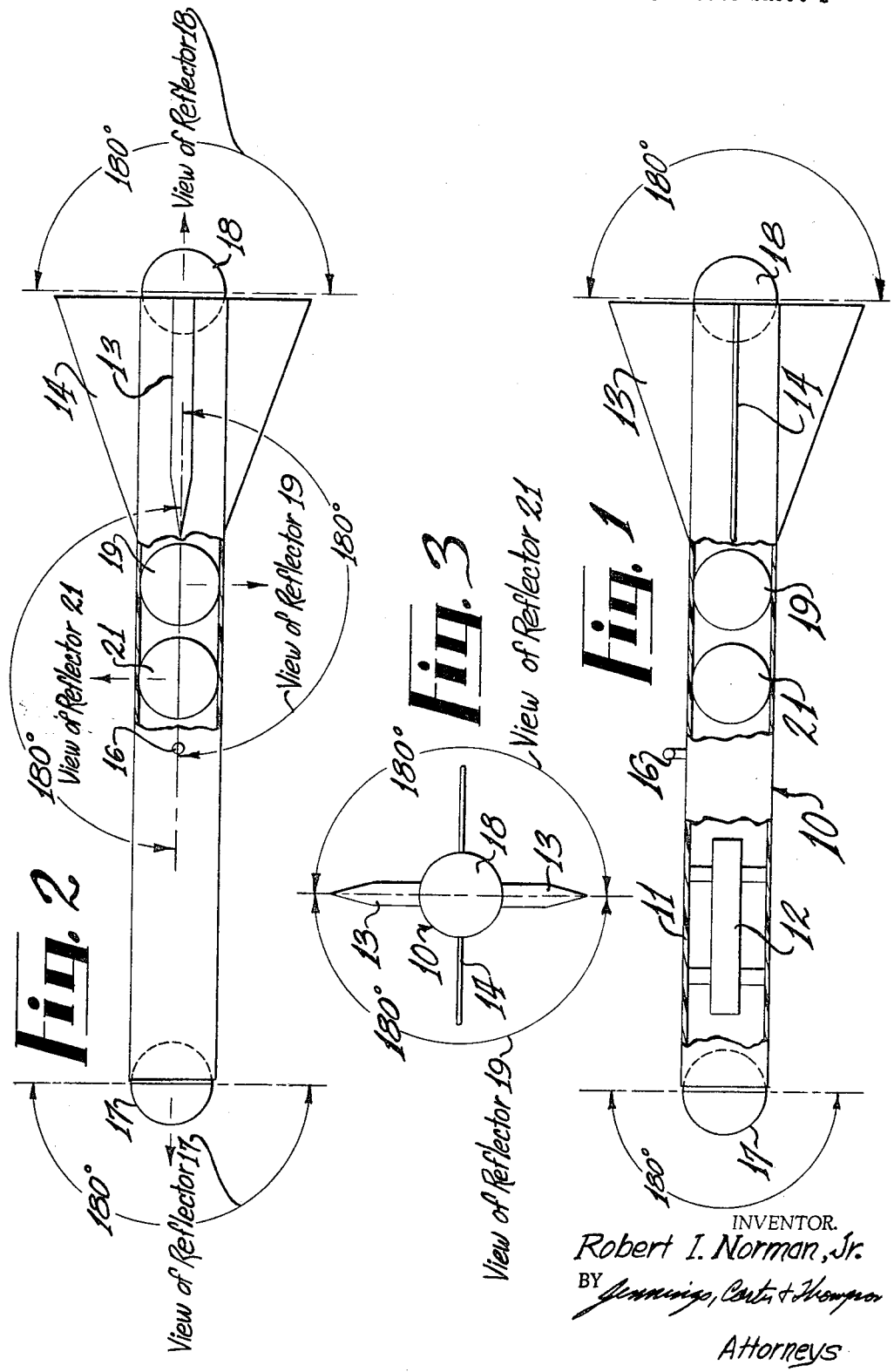
INVENTOR.
Robert I. Norman, Jr.
BY Jennings, Carter & Thompson
Attorneys INVENTOR.
Robert I. Norman, Jr.
BY Jennings, Carter + Thompson
Attorneys

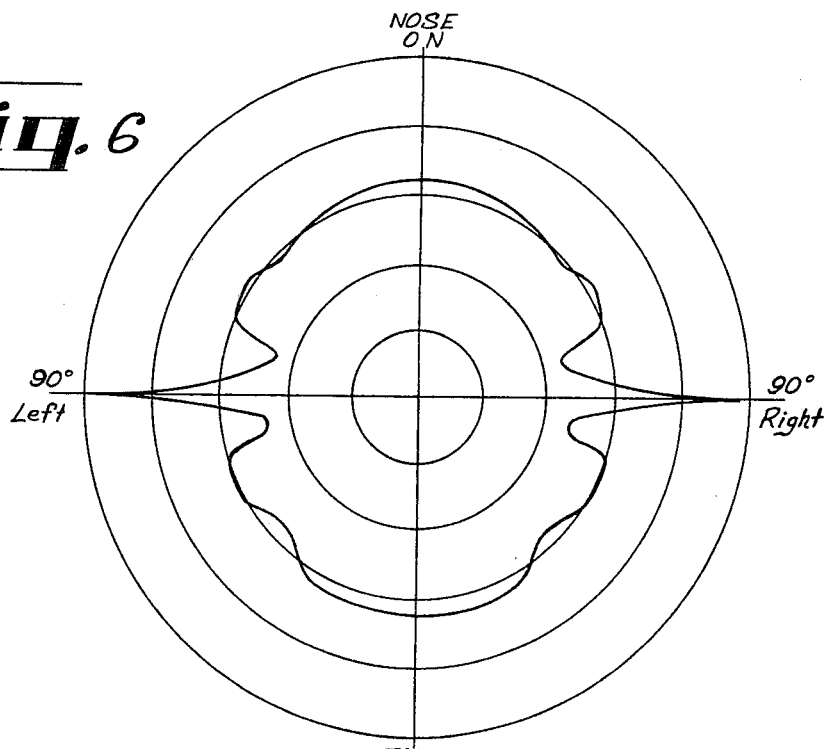
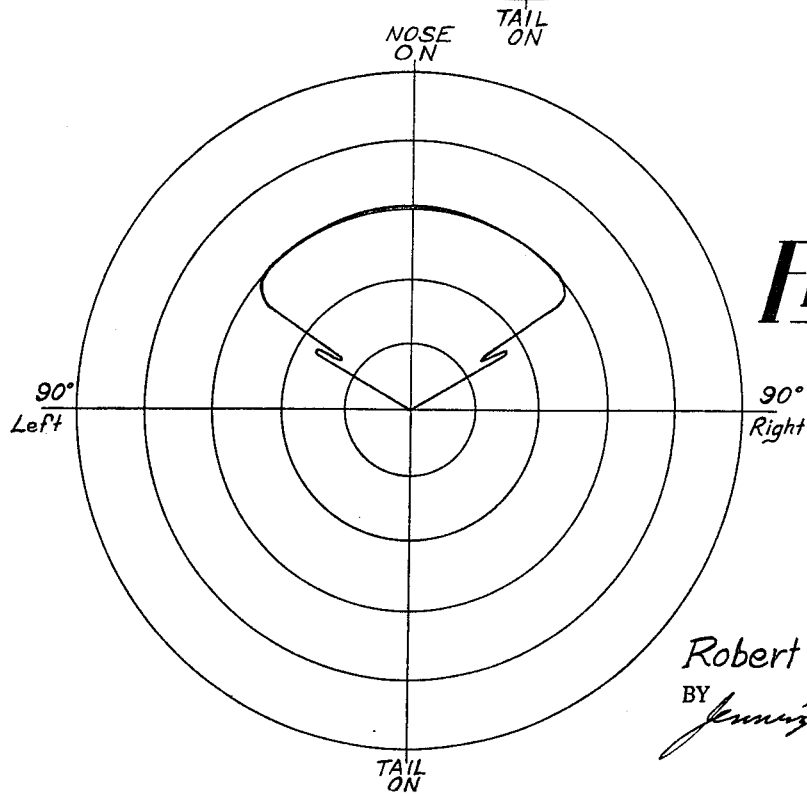

United States Patent Office 3,283,324
Patented Nov. 1, 1966

3,283,324
MEANS FOR CHANGING THE RADAR SIGNATURE OF AERIAL VEHICLES
Robert I. Norman, Jr., Birmingham, Ala., assignor to Hayes International Corporation, a corporation of Delaware
Filed June 29, 1964, Ser. No. 378,719
2 Claims. (Cl. 343—18)

This invention relates generally to radar augmentation and attenuation of aerial vehicles.

In the art to which this invention relates it is known that radar lens reflectors will produce a return equivalent to that of a flat plate having several times the area as that of the reflector cross section. This capability has been utilized in prior aerial vehicles to produce augmented radar returns which thus simulate larger radar targets.

It is also known that modern military aircraft employing jet engines have a different characteristic of radar reflectivity from the types using propellers. This is due not only to the greater general cleanliness of line of the jets, but also to the absence of the reflecting propeller disc. However, it is also known that jet aircraft have a characteristic radar signature.

Since radar is the prime modern detection apparatus, it becomes desirable for advanced training and evaluation to configure the reflected signature for the purpose of realism in much that same way as sighted targets have been visually silhouetted to trainees in the past. For this purpose the object is not merely a matter of getting the maximum amount of radar reflection from the vehicle as can be obtained within practical limits, but to achieve a pattern in size and shape which duplicates that of a known aerial vehicle. Thus, the prior art in so far as I am aware approached this problem from the standpoint of getting the maximum amount of reflectivity from the available lenses and other means, whereas my invention proceeds upon the concept of utilizing radar lens reflectors to conform the signature in both maximum and minimums, thus accurately to duplicate the radar appearance of a selected aerial target.

In view of the foregoing the general object of my invention is to provide means to change the radar signature of an aerial vehicle, such for instance as a towed target, from its normal characteristics to a desired radar signature equivalent to that of a known aerial target.

Another object of my invention is to accomplish the foregoing general object through the use of radar reflectors mounted on an aerial vehicle such as a towed target in such manner that the normal signature of the aerial vehicle being towed or otherwise moved through the air is modified or changed to produce a radar signature which actually conforms to that which would be produced by a known target.

A further object of my invention, in line with the foregoing general object, is to provide a towed aerial vehicle of the smallest practical size, equipped with radar reflectors, which reflectors are so related to each other and to the radar reflecting portions of the target, to produce a radar signature which is an exact duplicate of the signature which would be produced by a known target.

Another object of my invention is to so physically locate a plurality of reflectors on an aerial vehicle that the return from such reflectors, under some viewing aspects is reduced because of the interference between the two reflectors, or any reflecting surfaces of the vehicle, and to use this phenomenon to obtain the desired radar signature. Conversely, I arrange the reflectors relative to each other in such manner that instead of interferring with each other from certain viewing aspects, they will complement each other, and I employ this phenomenon, also, to shape and regulate the radar signature.

Apparatus illustrating features of my invention is shown in the accompanying drawings forming a part of this application in which:

FIG. 1 is a diagrammatic side elevational view, partly broken away and in section, and showing my invention incorporated in a towed target;

FIG. 2 is a plan view, also diagrammatic;

FIG. 3 is a diagrammatic end elevational view;

FIG. 6 represents the radar response in the same plane as FIG. 4, of a group of radar reflectors which could be used in conjunction with the structure represented by the diagram of FIG. 5 to produce the radar signatures shown in FIG. 4; and, FIG. 7 represents a typical response, in the same plane as FIG. 4, of a single reflector.

Figure 4:
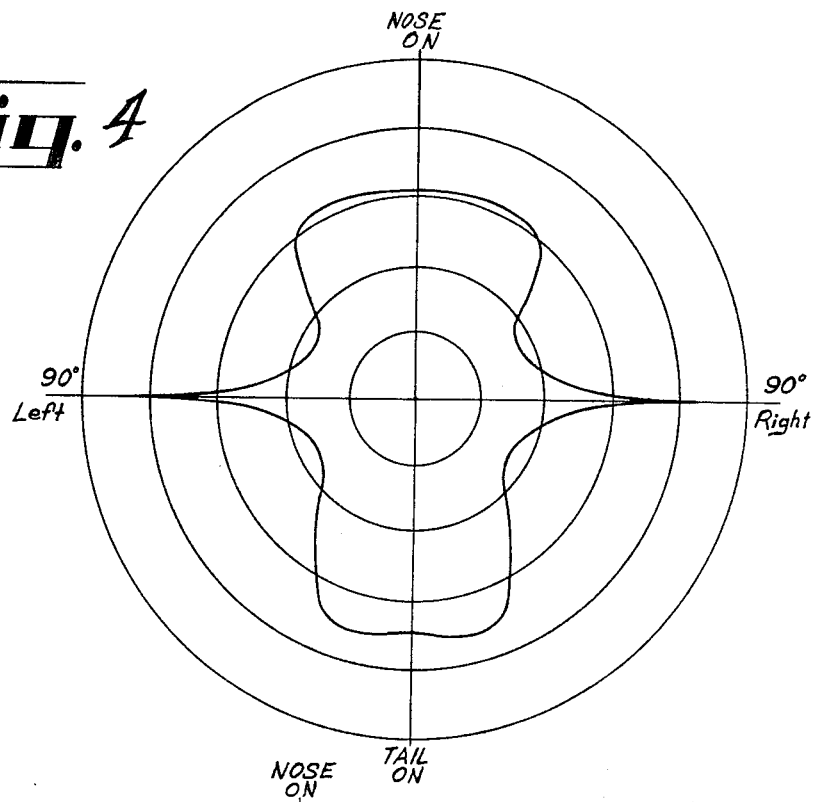
FIG. 4 is a diagrammatic representation, in a single plane, of the radar signature which it is desired to duplicate.
Figure 5:
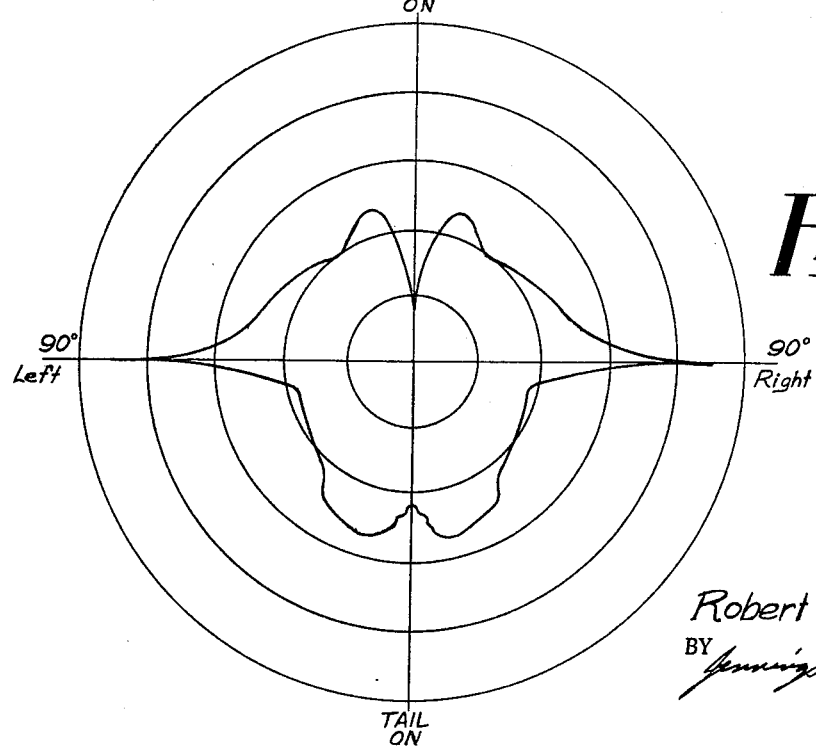
FIG. 5 is a diagrammatic view, in the same plane as FIG. 4, showing a typical radar response to an aerial vehicle not equipped with radar lens reflectors.

Referring now to the drawings and particularly to FIGS. 1, 2 and 3, I show in diagrammatic manner an aerial target which may be in the form of a towed target. Thus the target may consist of an elongated, tubular body indicated generally by the numeral 10. The outer skin of the target may conveniently be made of radar permeable material 11, such for instance as fiberglass. As is known, inside the tubular body are various devices made of material which are radar reflecting. In FIG. 1 I have illustrated diagrammatically such components by the numeral 12. In practice, such equipment may be radio receivers, metallic frame components for the target itself, switch gear, and so forth.

The target may be provided with vertical stabilizing surfaces 13 and horizontal stabilizing surfaces 14. The target may conveniently be towed from a point such as 16, from a cable, the other end of which of course is attached to an airplane or other towing vehicle.

Preferably mounted in the nose of the target is a radar reflector indicated diagrammatically by the numeral 17. Similarly, I mount in the rear of the target another radar reflector 18. Forwardly of the reflector 18 and located as will presently be described, and inside of the shell 11 is still another radar reflector 19. A fourth reflector 21 is also mounted inside the body, behind the radar permeable skin 11.

It will be noted that the reflector 17 is positioned so as to have a hemispherical field of view forwardly of the target; reflector 18 is mounted so as to have a rearwardly directed hemispherical field of view; reflectors 19 and 21 are positioned so as to have right and left lateral hemispherical fields of view.

Assuming it to be desirable to produce the radar signature shown in FIG. 4, which will be understood, is a view in one plane, it is necessary to take into account several variables. First, it is necessary to consider the location of the radar reflectors 17, 18, 19 and 21 relative to each other and also to consider the location of each of the reflectors relative to the reflecting parts of the vehicle on which they are mounted. Next, it is necessary to consider and to take into account the power of the radar reflectors namely, their mono-static and bi-static characteristics. Thirdly, it is necessary to take into account the field and direction of view of each of the radar reflectors.

The first step is to determine what degree of reflectivity the target itself possesses, without any augmentation at all. One convenient way of determining the amount of flat plate projected area radar effect is to place the completed target in an anechoic chamber and measure its reflectivity. Having now determined the radar reflectivity in this manner from all of the desired viewing angles, the next step is to determine the amount of added reflectivity which must be supplied by the radar reflectors. Assume, for instance, that the radar reflectability of the target without any augmentation, from a given viewing angle, is one square meter and that eight square meters are required to get the desired radar signature. This would mean that it would be necessary to provide radar reflectors on the target itself which would increase its radar reflectability by seven square meters. Of course, and as is understood, these figures are approximate in the sense that it is necessary to consider the secondary effects of physical location of the reflectors one to the other and their location relative to the radar reflecting portions of the target itself. For all practical purposes, however, this determination is accurate enough.

Having determined the foregoing, the next step is to use the appropriate number of 180° field reflectors, thus to obtain full spherical coverage. Initially, the reflector 17 is installed in the nose and reflector 18 is installed in the tail. These reflectors thus view 180° solid angles forwardly and rearwardly of the target center line. The inherent reflectivity of the target itself which has already been determined will be affected by the addition of the two reflectors 17 and 18. The degree of this effect is evaluated again in the anechoic chamber. In the event it is found that there is an interference between either of the reflectors 17 and 18 and the structure which is detrimental to the desired signature, the fields of view of the lenses may be reduced thus to avoid a source of interference. The desired signature duplication may be further defined by orienting the reflectors to center their viewing along a line not coincident with the longitudinal center line of the target. Having accomplished the foregoing, the primary characteristics of the fore and aft portions of the signature are established.

The next step is to put in place the two reflectors 19 and 21, looking essentially in opposite directions, laterally. Through the use of the anechoic chamber the interference effects are determined between, for instance, the reflector 19 and the reflectors 17 and 18, and the inherent reflectability of the target. Again, the interference effects can be altered by reducing the field of view of the reflector 19 or, the interference effect can be changed by physically shifting the position of reflector 19 relative to the other three sources of reflectivity, namely, lenses 17 and 18 and the portions of the target which cause reflectability. The next step is to repeat the operation just carried out with respect to the reflector 19 with reflector 21 on the opposite side of the target.

In summary, with respect to what has so far been described, it will be seen that the lateral or beam portions of the signature may be adjusted either by altering the field and power of the reflectors 19 and 21, by a fore and aft movement of the reflectors 19 and 21, or by an adjustment of the power and viewing angle of the nose and tail reflectors 17 and 18, as a combination of all.

In view of the fact that the anechoic chamber measures only in a single plane, the next step is to reposition the target in the chamber to look at the target at other angles. The first step is to rotate the target about its longitudinal axis substantially 90° to obtain the measurement of an aspect perpendicular to that which was previously taken. In other words, if the view taken in the chamber previously would represent a plan view of, for instance, an airplane, the view now to be taken would represent a side view of that same airplane. In order to duplicate the signature from this view, the same adjustments, in the same order are carried out. It is of course apparent that any adjustment made in arriving at the signature for the side view of the target may change the characteristics of the signature previously arrived at from the plan view standpoint. However, by a proper selection of the four variables mentioned and by making relatively minor adjustments, an exact duplication of a desired signature, truly representative of a given target, can be obtained.

In some instances only a part of an incomplete signature may be needed. In such a case it will be seen that one may employ a fewer number of reflectors than shown and described herein. By the same token, there are instances wherein the reproduction of a very complicated signature may necessitate the use of more reflectors than shown and described herein.

Referring to FIGS. 4 to 7 inclusive, the curves depict the degree of relative radar reflective power at viewing aspects of the polar projection in a common plane. These curves will change slightly with variations in the plane of the radar cut, but they substantially represent the typical signatures obtained. This is true in shape for both the monostatic and bistatic cases. In the latter the power level will, of course, always be reduced below that for the monostatic.

From the foregoing it will be apparent that I have devised an improved system and arrangement wherein, through the use of an extremely small and compact aerial vehicle I am enabled faithfully to duplicate in accurate manner the radar signature which would be produced by a much larger vehicle. The fidelity of the desired signature is accomplished by the herein disclosed utilization, application and correlation of only four variables. Thus, starting with the known reflectivity of the target or body which is to carry the reflectors, my invention as herein disclosed makes it possible to equip such vehicles with reflectors so that the augmented reflectivity of the reflectors is modified by the reflectivity of the vehicle on which they are mounted. In practice, utilizing a towed target consisting of a body approximately seven feet long and seven inches in diameter I have faithfully reproduced the three dimensional signature of large fighter aircraft.

While various forms of radar reflectors may be used, I prefer to use what are commonly called "Luneberg" lenses. These are shown and described particularly in United States Letters Patent 2,849,713, August 26, 1958, "Spherical Microwave Lens" and United States Letters Patent 2,761,141, August 28, 1956, "Continuously Varying Dielectric Constant Electro Magnetic Lens."

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Means to change the radar signature of an aerial vehicle having radar reflective body parts from its normal characteristics to a radar signature substantially identical to that of a desired aerial target comprising a plurality of Luneberg lens radar reflectors located in positions on said vehicle relative to each other and relative to the radar reflective parts of the vehicle to augment the radar signature thereof when viewed from corresponding aspects and to attenuate the radar signature thereof when viewed from other corresponding aspects, thereby to configure the radar signature of the vehicle in those areas where the normal reflectivity thereof varies from said substantially identical signature, whereby the radar reflector equipped vehicle may be physically substantially smaller and of different overall shape from the desired target and yet produce said substantially identical radar signature.

2. In an aerial vehicle,
 (a) an axially elongated body including parts which are radar reflective and other parts which are made of radar permeable material,
 (b) a plurality of Luneberg lens type radar reflectors,
 (c) means mounting said lenses in the body at distances relative to each other and to the radar reflective parts of the body to regulate the contribution of said reflective parts of the body to the radar pattern of the entire body and lenses, and (d) at least some of the lenses being mounted behind the radar permeable parts of the body and others thereof being mounted on the ends of the body, said lenses having such reflective strength, viewing angles and monostatic-bistatic balance and being so located and oriented relative to the radar reflective parts of the body and to each other that the target as a whole produces a substantially exact radar signature corresponding to that of a desired target.

References Cited by the Examiner

UNITED STATES PATENTS

| | | | |
|---|---|---|---|
| 3,010,103 | 11/1961 | Hopper et al. | 343—18 |
| 3,010,104 | 11/1961 | Powell | 343—18 |
| 3,019,432 | 1/1962 | Johnston | 343—18 |
| 3,020,542 | 2/1962 | Johnston | 343—18 |

CHESTER L. JUSTUS, *Primary Examiner.*

LEWIS H. MYERS, *Examiner.*

J. P. MORRIS, *Assistant Examiner.*